US006865934B2

(12) United States Patent
Schultz et al.

(10) Patent No.: US 6,865,934 B2
(45) Date of Patent: Mar. 15, 2005

(54) SYSTEM AND METHOD FOR SENSING LEAKAGE ACROSS A PACKER

(75) Inventors: Roger L. Schultz, Aubrey, TX (US); Timothy M. Young, Coppell, TX (US); Russell I. Bayh, III, Carrollton, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 127 days.

(21) Appl. No.: 10/251,160

(22) Filed: Sep. 20, 2002

(65) Prior Publication Data

US 2004/0059506 A1 Mar. 25, 2004

(51) Int. Cl.[7] .............................................. E21B 47/10
(52) U.S. Cl. .................................................. 73/152.36
(58) Field of Search .......................... 73/152.18, 152.26, 73/152.36, 861.08, 40.5 A, 46, 47; 166/250.17, 250.8, 250.08; 175/50, 230

(56) References Cited

U.S. PATENT DOCUMENTS

| | | | |
|---|---|---|---|
| 4,067,349 A | 1/1978 | Austin et al. ................. 138/97 |
| 4,136,552 A | * 1/1979 | Hasha ........................... 73/46 |
| 4,206,810 A | 6/1980 | Blackman .................... 166/336 |
| 4,353,249 A | * 10/1982 | Lagus et al. .............. 73/152.41 |
| 4,426,882 A | 1/1984 | Skinner ........................ 73/155 |
| 4,506,731 A | 3/1985 | Skinner ...................... 166/113 |
| 4,508,174 A | 4/1985 | Skinner et al. ............. 166/373 |
| 4,582,136 A | 4/1986 | Skinner ...................... 166/250 |
| 4,866,607 A | 9/1989 | Anderson et al. ........... 364/422 |
| 4,999,817 A | 3/1991 | Zimmer ........................ 367/65 |
| 5,234,057 A | 8/1993 | Schultz et al. .............. 166/319 |
| 5,236,048 A | 8/1993 | Skinner et al. ............. 166/382 |
| 5,273,113 A | 12/1993 | Schultz ....................... 166/250 |
| 5,279,363 A | 1/1994 | Schultz et al. ................ 166/53 |
| 5,293,937 A | 3/1994 | Schultz et al. .............. 166/250 |

(List continued on next page.)

FOREIGN PATENT DOCUMENTS

| DE | 3537775 A1 | * 4/1987 | ............ G01M/3/28 |
|---|---|---|---|
| GB | 2373804 A | * 10/2002 | ........... E21B/47/12 |
| GB | 2373805 A | * 10/2002 | ........... E21B/47/12 |

*Primary Examiner*—Hezron Williams
*Assistant Examiner*—John Fitzgerald
(74) *Attorney, Agent, or Firm*—John W. Wustenberg; Warren B. Kice

(57) ABSTRACT

A system and method for sensing leakage across a packer in a well, according to which a sensor is disposed in the well for sensing a characteristic of the packer such as vibrations, and a corresponding signal is outputted that is indicative of whether there is any fluid leakage across the device.

17 Claims, 1 Drawing Sheet

U.S. PATENT DOCUMENTS

| | | | | |
|---|---|---|---|---|
| 5,318,129 A | * | 6/1994 | Wittrisch | 166/336 |
| 5,318,137 A | | 6/1994 | Johnson et al. | 175/40 |
| 5,332,035 A | | 7/1994 | Schultz et al. | 166/53 |
| 5,355,960 A | | 10/1994 | Schultz et al. | 166/374 |
| 5,367,911 A | | 11/1994 | Jewell et al. | 73/861.08 |
| 5,412,568 A | | 5/1995 | Schultz | 364/422 |
| 5,490,564 A | | 2/1996 | Schultz et al. | 166/374 |
| 5,503,225 A | * | 4/1996 | Withers | 166/250.1 |
| 5,899,958 A | | 5/1999 | Dowell et al. | 702/6 |
| 5,944,446 A | * | 8/1999 | Hocking | 405/129.4 |
| 6,050,131 A | | 4/2000 | Willauer | 73/37 |
| 6,070,672 A | | 6/2000 | Gazda | 166/386 |
| 6,131,658 A | | 10/2000 | Minear | 166/250.01 |
| 6,144,316 A | | 11/2000 | Skinner | 340/853.7 |
| 6,148,912 A | * | 11/2000 | Ward | 166/250.07 |
| 6,173,772 B1 | * | 1/2001 | Vaynshteyn | 166/250.15 |
| 6,179,084 B1 | * | 1/2001 | Yamamoto et al. | 181/106 |
| 6,229,453 B1 | | 5/2001 | Gardner et al. | 340/853.8 |
| 6,233,746 B1 | | 5/2001 | Skinner | 2/227.18 |
| 6,236,620 B1 | | 5/2001 | Schultz et al. | 367/82 |
| 6,257,332 B1 | * | 7/2001 | Vidrine et al. | 166/250.15 |
| 6,273,189 B1 | | 8/2001 | Gissler et al. | 166/241.1 |
| 6,286,596 B1 | | 9/2001 | Schnatzmeyer et al. | 166/250.15 |
| 6,310,559 B1 | | 10/2001 | Laborde et al. | 340/853.2 |
| 6,321,838 B1 | | 11/2001 | Skinner | 166/250.01 |
| 6,328,119 B1 | | 12/2001 | Gillis et al. | 175/325.1 |
| 6,384,738 B1 | | 5/2002 | Carstensen et al. | 340/854.3 |
| 6,394,181 B2 | | 5/2002 | Schnatzmeyer et al. | 166/250.15 |
| 6,609,568 B2 | * | 8/2003 | Krueger et al. | 166/250.07 |
| 2001/0013410 A1 | | 8/2001 | Beck et al. | 166/65.1 |
| 2001/0013411 A1 | | 8/2001 | Beck et al. | 166/65.1 |
| 2001/0040033 A1 | | 11/2001 | Schnatzmeyer et al. | 166/250.15 |
| 2001/0042617 A1 | | 11/2001 | Beck et al. | 166/65.1 |
| 2001/0043146 A1 | | 11/2001 | Beck et al. | 340/855.8 |

* cited by examiner

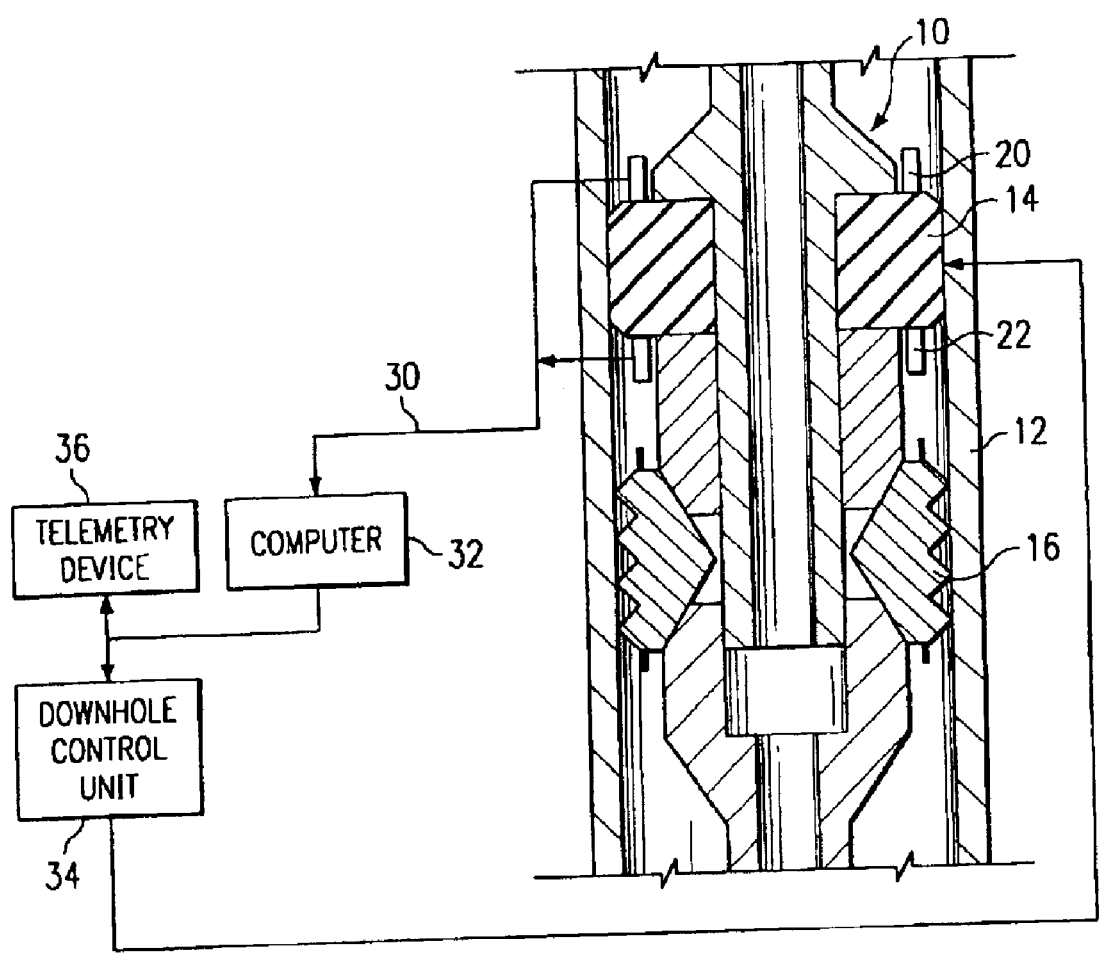

SYSTEM AND METHOD FOR SENSING LEAKAGE ACROSS A PACKER

BACKGROUND

Downhole packers are commonly used in many oilfield applications for the purpose of sealing against the flow of fluid to isolate one or more portions of a wellbore for the purposes of testing, treating, or producing the well. Non-limiting examples of fluid include: liquids such as oil and water, gases such as natural gas, and three-phase flow. The packers are suspended in the wellbore, or in a casing in the wellbore, from a tubing string, or the like, and are activated, or set, so that one or more packer elements engage the inner surface of the wellbore or casing.

However, after the packer elements have been set in the wellbore in the above manner, leakage across the sealing elements in the packer element can occur. This leakage is not usually detected until a catastrophic element failure occurs.

Accordingly, it would be highly desirable to detect packer element leakage as soon as it starts so remedial action can be taken to correct the leakage.

BRIEF DESCRIPTION OF THE DRAWINGS

The drawing is a partially sectional, partially diagrammatic view of a downhole system including a packer element and a system for detecting leakage across the packer element.

DETAILED DESCRIPTION

Referring to the drawing, a downhole tool is referred to, in general, by the reference numeral 10 and is shown installed in a casing 12 disposed in a well. The well can be either a cased completion as shown in the drawing or an openhole completion. The tool 10 is lowered to a predetermined depth in the casing 12 as part of a workstring, or the like, (not shown) which often includes other tools used to perform various oil recovery and completion operations. Since the tool 10 is conventional, it will not be described in detail.

The tool 10 includes a packer comprising an annular packer element 14 and an annular slip 16 located downstream, and axially spaced, from the packer element 14. The packer element 14 is located at a predetermined axial location in the casing 12 and is set, or activated, in a conventional manner which causes it to engage the inner surface of the casing 12 to seal against the flow of fluids and thus permit the isolation of certain zones in the well. The slip 16 functions to engage, or grip, the inner wall of the casing 12 and lock the packer in place. Since the packer element 14 and the slip 16 are conventional, they will not be described in further detail.

Two sensors 20 and 22 are disposed in the casing 12 just above and below the packer element 14, respectively, and are attached, or secured, to the packer element 14 in any conventional manner. The sensors 20 and 22 can be in the form of accelerometers, for example, that are adapted to sense, and respond to, relatively high frequency vibrations, or acoustic pressure waves, produced within the packer element 14 in a manner to be described. The sensors 20 and 22 can be annular in shape as shown, or each sensor can consist of a plurality of modules that are angularly spaced around the slip 16.

An electronics package is provided that includes an electrical circuit shown, in general, by the reference numeral 30 that electrically connects the sensors 20 and 22 to a computer 32, such as a microprocessor, or the like. An output of the computer 32 is connected, via the electrical circuit 30, to a downhole control unit 34 and/or to a telemetry device 36. The output of the computer 32 can be, for example, electrical signals. The computer 32 includes software containing a leakage detection algorithm, and the control unit 34 is coupled to the packer element 14 and is adapted to mechanically adjust the set of the packer element 14 in a conventional manner, under conditions to be described. The telemetry device 36 is adapted to transmit the signals received from the computer 32 to a remote location, such as to the ground surface.

In operation, after the packer element 14 is set and put into service, mechanical stresses will be induced in the packer element 14 as a result of the presence of fluid in the casing 12 adjacent the packer element 14. These stresses cause corresponding vibrations, or acoustic pressure waves, of the packer element 14, which vibrations are relatively low in frequency when the packer element 14 is set properly, and are relatively high in frequency when there is a leakage across the packer element 14 caused by significant fluid flow velocities across the packer element 14.

These vibrations are sensed by the sensors 20 and 22 which are adapted to output corresponding signals to the computer 32. These signals are analyzed, and the leakage detection algorithm is applied, at the computer 32, and corresponding output signals are generated which are indicative of whether or not there is leakage across the packer element 14, and, if so, the amount of leakage.

The signals from the computer 32 are sent, via the electrical circuit 30 to either the control unit 34 and/or the telemetry device 36. If the signals are sent to the control unit 34, it automatically adjusts the set of the packer element 14 to eliminate the leakage. If the signals are sent to the telemetry device 36, it transmits the signals to the surface where analysis is performed to determine the leak conditions of the packer element 14.

Variations and Equivalents

According to an alternate embodiment, the sensors 20 and 22 can be in the form of hydrophones that detect the vibrations, or acoustic pressure waves, across the packer element 14, as described above.

It is understood that several other variations may be made in the foregoing without departing from the scope of the invention. For example, the number of sensors can be varied, and a combination of accelerometers and hydrophones can be used. Also, the sensors can be located only above or only below the packer element 14 or within the packer element 14 or the mechanical packer structure. Further, the information sensed by the sensors and processed by the electrical circuit 30 and the associated equipment connected to the electrical circuit 30 in the above manner, could be used during the installation of the packer element 14 to check for a proper set so that remedial action can be taken at this early stage. Still further, the computer 32, the control unit 34, and/or the telemetry device 36 can each be located either downhole or at the ground surface. Moreover, the present invention is not limited to sensing of leakage across packers, but is equally applicable to leakage across other components of the above workstring.

It is understood that spatial references, such as "axially", "radially", "downstream", etc. used above are for the purpose of illustration only and do not limit the specific spatial orientation or location of the components described above.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A downhole sealing and monitoring system comprising:
    a packer for forming a fluid seal with a bore, and causing relatively low-frequency vibrations of the packer by the fluid when the packer is set properly and relatively high-frequency vibrations of the packer due to fluid leakage across the packer when the packer is not set properly;
    a sensor for sensing the vibrations of the packer and outputting a signal corresponding to the vibrations;
    electronics connected to the sensor for processing the signal and providing an output corresponding to any leakage; and
    a control unit responsive to the output for adjusting the packer to eliminate the leakage.

2. The system of claim 1 wherein the control unit adjusts the set of the packer.

3. The system of claim 1 wherein the output indicates the amount of any leakage.

4. The system of claim 1 wherein the electronics comprises a computing device for executing a leakage detection algorithm.

5. The system of claim 1 wherein the sensor is mounted on the packer.

6. The system of claim 1 wherein the sensor is an accelerometers.

7. The system of claim 1 wherein the sensor is a hydrophones.

8. The system of claim 1 further comprising a telemetry unit for receiving the output and transmitting it to a remote location.

9. A downhole sealing and monitoring method comprising:
    inserting a packer in a wellbore or casing;
    setting the packer to form a fluid seal so that the fluid causes relatively low-frequency vibrations of the packer when it is set properly and relatively high-frequency vibrations of the packer when it is not set properly;
    sensing the vibrations of the packer;
    producing a signal corresponding to the vibrations; and
    processing the signal and providing an output corresponding to fluid leakage across the packer.

10. The method of claim 9 wherein the relatively high-frequency vibrations of the packer occur due to the fluid leakage.

11. The method of claim 9 wherein the output corresponds to the amount of any fluid leakage across the device.

12. The method of claim 9 wherein the step of processing comprises applying a leakage detection algorithm to the signal.

13. The method of claim 9 wherein the step of sensing comprises mounting an accelerometers on the packer.

14. The method of claim 9 wherein the step of sensing comprises mounting a hydrophones on the packer.

15. The method of claim 9 further comprising the step of transmitting the signal to a remote location.

16. The method of claim 9 further comprising adjusting the packer in response to the output to correct for any leakage.

17. The method of claim 16 wherein the step of adjusting comprises adjusting the set of the packer.

* * * * *